United States Patent Office 3,770,816
Patented Nov. 6, 1973

3,770,816
DIPERISOPHTHALIC ACID COMPOSITIONS
Donald R. Nielsen, Corpus Christi, Tex., assignor to PPG Industries, Inc., Pittsburgh, Pa.
No Drawing. Continuation-in-part of application Ser. No. 418,541, Dec. 15, 1964. This application July 23, 1969, Ser. No. 844,164
Int. Cl. C07c 73/10
U.S. Cl. 260—502 R 8 Claims

ABSTRACT OF THE DISCLOSURE

Diperisophthalic acid is formulated with inert hydrated salts which retain water of hydration at temperatures up to 30° C. but give up considerable water of hydration below the normal decomposition temperature of the acid such as below 130° C. to dampen the detonability of the diperisophthalic acid.

RELATED APPLICATIONS

This application is a continuation-in-part of copending application Ser. No. 418,541, filed Dec. 15, 1964.

THE INVENTION

Diperisophthalic acid is capable of liberating active oxygen for bleaching and various oxidizing reactions. A characteristic of this peracid is its tendency to be explosive or detonable when exposed to elevated temperatures or shock. It also has a tendency to decompose in a nonexplosive manner and hence lose its active oxygen content.

According to copending application Ser. No. 308,323, filed Sept. 12, 1963, the stability of perphthalic acids, notably diperisophthalic acid, is improved by incorporating with the peracid an alkali metal or alkaline earth metal salt of an acid having an ionization constant at 25° C. for the first hydrogen of at least $1 \times 10^{-3}$, preferably not less than $1 \times 10^{-2}$. Among those salts specifically mentioned are sodium sulfate, magnesium sulfate, and like alkali metal or alkaline earth metal sulfates such as potassium sulfate, ammonium sulfate, and lithium sulfate. Sodium bisulfate or potassium bisulfate as well as other alkali metal bisulfates are also mentioned.

This invention concerns perisophthalic acids, notably diperisophthalic acid. More particlarly, it concerns solid particulate non-detonable compositions of diperisophthalic acid.

In accordance with the present invention, it has been discovered that the detonability or explosibility of diperisophthalic acid can be materially dampened, even obviated, by incorporating with the peracid a hydrated salt which retains at atmospheric pressure water of hydration (or crystallization) at temperatures of at least 30° C. but gives up considerable water of hydration at a temperature above 30° C., notably from about 60° C. to 130° C., possibly 150° C., more preferably in the temperature range of 85° C. to 130° C.

While considerable latitude is permissible in the amount of inert, inorganic hydrated salt which is used, the amounts of such salts usually are substantial. Generally, sufficient salt is used to provide compositions containing 0.25 or more parts (but rarely more than about 5 or 10 parts lest the composition be too highly diluted) water of hydration (which is released in the desired temperature range, e.g., such as between 60° C. and 130° C.) per part by weight of diperisophthalic acid. As hereinafter discussed, according to certain embodiments, as little as about 0.1 part of such water of hydration per part of diperisophthalic acid may be used to advantage in providing protection against peracid detonation.

Recommended are compositions of diperisophthalic acid in combination with inorganic hydrated salts which give up or release substantial water of hydration (crystallization) at temperatures above about 85° C. but below about 130° C. While the hydrated salts which release all their water of hydration between 60° C. and 150° C. (or more medially between 85° C. and 130° C.) may offer advantage, effective compositions are attained when the hydrated salts release a portion of their water of hydration within this temperature range. Thus, salts which have a stable hydrated form above 150° C. may be used if they release water of hydration between 60° C. to 150° C., that is, such salts with several hydrates are contemplated.

Especially preferred particulate free flowing compositions are those of diperisophthalic acid and hydrated salts which have their hydrated forms stable at temperatures below 60° C. but which give up their water of hydration at temperatures above 60° C. but below the temperature at which the diperisophthalic acid detonates, i.e., about 120–130° C. Those hydrated salts which under normal conditions (including conditions which the compositions are apt to encounter during storage and shipment) release any significant amount of water of hydration have disadvantages. For example, release as liquid water of hydration can interfere with the composition's free flowing characteristics and possibly cause decomposition of the peracid. Ergo, if the composition is destined during storage and shipment for exposure to cooler climatic conditions it can include hydrated salts which retain all their water of hydration at temperatures below 30° C., but release water of hydration (some or all) somewhat above 30° C. (and below 60° C.). When the formulation is to encounter the warmer climatic conditions, the hydrated salt should be one which retains water of hydration at the warmer temperature, e.g., usually a salt which retains water of hydration below about 60° C.

It is better if the water of hydration content of the salt is high enough so that admixture of reasonable quantities thereof will provide compositions having an adequate diperisophthalic acid content. In this regard, compositions normally will contain at least about 0.5 percent and more preferably at least 1.0 percent by weight of the diperisophthalic acid basis the acid and hydrated salt. Compositions with active oxygen contents of between 0.05 and 5 or possibly up to 10 percent by weight (basis the acid and hydrated salt) are to be preferred over those whose peracid content is more diluted.

A further desirable characteristic of the hydrated salt is that it be slightly acidic or essentially neutral, i.e., it should not be strongly alkaline. Thus, preference is for those hydrated salts whose 1 weight percent solutions in distilled water have a pH of from about 3 to about 8.

Any of a wide number of one or more inert hydrated salts meeting these aforementioned qualifications combine with diperisophthalic acid to provide non-detonable compositions. Among the hydrated salts which may be specifically noted are magnesium sulfate·$7H_2O$ (commonly called epsom salt), magnesium formate dihydrate, magnesium benzoate trihydrate, magnesium acetate tetrahydrate, magnesium nitrate ($Mg(NO_3)_2 \cdot 6H_2O$), calcium sulfate ($CaSO_4 \cdot 2H_2O$), calcium lactate hydrate, calcium sodium sulfate ($CaSO_4 \cdot 2Na_2SO_4 \cdot 2H_2O$), the recognized hydrates of the various alkali metal aluminum sulfates including sodium aluminum sulfate, potassium aluminum sulfate, ammonium aluminum sulfate and aluminium sulfate (notably the octadecahydrate). Other suitable hydrates include lithium formate monohydrate, sodium sulfate decahydrate, sodium acetate trihydrate and the substantially neutral or acidic hydrates of alkali metal polyphosphates such as $Na_2H_2P_2O_7 \cdot 5H_2O$. Salts of sodium, potassium, aluminum, calcium and magnesium are of particular appeal.

Depending upon the ultimate manner in which the diperisophthalic acid is to be formulated and used, compositions of the hydrated salt and acid may also include a variety of other constituents. Salts such as are described in my copending application Ser. No. 308,323, filed Sept. 12, 1963, which impart stability to the perisophthalic acid and discourage or deter decomposition or loss of active oxygen upon standing may also be included along with the peracid and hydrated salt.

It would not normally be considered desirable to incorporate easily oxidized organic materials which can contaminate the composition or promote instability of diperisophthalic acid. However undesirable as this may be, effective marketing of the diperisophthalic acid, may dictate it be combined with synthetic organic detergents such as alkyl sulfates, sulfonates and the like. Similar dilemmas are encountered if the diperisophthalic acid is compounded with other materials which are strongly alkaline such as these detergents.

This difficulty may be alleviated, however, by coating or encapsulating either the strongly alkaline ingredients or the mixture of diperisophthalic acid and hydrated salt with a suitable inert protective coating of paraffin wax, polyvinyl alcohol, polystyrene, polymethyl methacrylate, starch, gelatin, carboxymethyl cellulose, or various substantially inert inorganic materials including calcium sulfate, sodium sulfate and the like, to segregate the detergent, alkaline agent or like material from the diperisophthalic-hydrated salt mixture. So protected by such encapsulation or coating, the mixture may be compounded or formulated with dry detergents or other materials.

It is also possible to alleviate this aforementioned difficulty by techniques other than coating or encapsulation. For example, the particle size of components of the mixtures may be adjusted to minimize any lack of compatibility. Thus, mixtures of relatively coarse diperisophthalic acid granules are mixed with granulated detergent. These coarse diperisophthalic acid granules preferably are formed by granulating a homogeneous mixture of very finely divided diperisophthalic acid and finely divided hydrated salt, which granules are then mixed with the granulated detergent. Alternatively, mixtures of pellets or large pellets in which the detergent components and the diperisophthalic acid-hydrated salt mixture are physically separated may be employed.

According to a further embodiment, the contemplated compositions of diperisophthalic acid and hydrated salt may have advantageously incorporated therewith ammonium salts such as ammonium sulfate or ammonium acetate which decompose or hydrolyze in the presence of moisture at temperatures below the explosion temperature of the diperisophthalic acid into fragments which accelerate the peracid decomposition below detonation or explosion temperatures. In this fashion, energy from the diperisophthalic acid decomposition is expended at temperatures below those at which explosion will occur, thus reducing the energy available when the explosion temperature is reached during accidental overheating, such as by fire, friction or mechanical shock. When the composition includes a salt such as ammonium sulfate, the amount of solid water (water of hydration) required to protect against undue decomposition can be reduced considerably. Use of such salts is particularly apropos to avoid undue dilution of the diperisophthalic acid with hydrated salt or to permit use of hydrated salts which otherwise would not have a high enough water of hydration content. Usually from about 0.05 to 2.0 parts or more of such a decomposable salt by weight of the diperisophthalic acid functions well. Other ammonium salts as the term is herein used which are useful for this function include primary, secondary or tertiary amine salts such as sulfates, chlorides, phosphates, nitrates or acetates, quaternary ammonium salts, ammonium polyphosphates and polyborates.

It is especially important when the composition is to be either coated or encapsulated at elevated temperatures to recognize the advisability of employing a hydrated salt which does not give up water of hydration at temperatures below 60° C. or even 80° C. Many of the coatings are efficiently applied at temperatures somewhat above 60° C. For example, paraffin wax may be applied by a method which includes the step of first melting. Melting temperatures in excess of ambient temperatures (i.e., as high as about 60° C. or somewhat higher) but below the decomposition temperatures of the diperisophthalic acid thus can be involved. If the hydrated salt is one which loses water of hydration at temperatures which are employed in the coating, the free flowing powdery characteristics of the composition may be lost and coated inefficient.

The following examples illustrate the dampening effect admixtures of hydrated salts have on diperisophthalic acid.

EXAMPLE I

Diperisophthalic acid (analyzing 95 to 97 percent by weight diperisophthalic acid) was thoroughly mixed with the salt and in the proportions listed in Table I. The resulting composition was then placed in a test tube in an air bath provided by a stainless steel beaker heated by a hot plate. The beaker was covered with a Teflon sheet and the air circulated while its temperature was raised at the rate of 5° C. to 7° C. per minute. Temperatures of the bath and sample were recorded continuously during the tests. Heating of the air bath continued until both the air temperature and the sample temperature were well above the normal decomposition temperature (120° C.–130° C.) of the diperisophthalic acid.

TABLE I

| Additive | Additive weight, grams | DPI[1] weight, grams | Decomposition temp., ° C. | Air bath temp. at time of decomposition, ° C. | Maximum temp. after decomposition, ° C. |
|---|---|---|---|---|---|
| AlNa(SO$_4$)$_2$·12H$_2$O | 0.4 | 0.2 | 137–138 | 140 | 163–170 |
| AlNa(SO$_4$)$_2$·12H$_2$O | 4.0 | 1.0 | 110 | 134 | 149 |
| AlK(SO$_4$)$_2$·12H$_2$O | 0.4 | 0.2 | 139 | 154 | >200 |
| AlK(SO$_4$)$_2$·12H$_2$O | 4.0 | 1.0 | 136 | 153 | 193 |
| AlNH$_4$(SO$_4$)$_2$·12H$_2$O | 1.6 | 0.4 | 115 | 158 | 189 |
| AlNH$_4$(SO$_4$)$_2$·12H$_2$O | 4.0 | 1.0 | 113 | 166 | 138 |
| MgSO$_4$·7H$_2$O | 0.2 | 0.1 | 143 | 140 | 172 |
| MgSO$_4$·7H$_2$O | 4.0 | 1.0 | 98 | 154 | 108 |
| MgSO$_4$·7H$_2$O | 8.0 | 2.0 | 120 | 153 | 178 |
| Mg(NO$_3$)$_2$·6H$_2$O | 0.2 | 0.1 | 110 | 122 | 157 |
| Mg(NO$_3$)$_2$·6H$_2$O | 0.8 | 0.4 | 120 | 150 | 175 |
| Al(NO$_3$)$_2$·9H$_2$O | 0.4 | 0.2 | 110 | 115 | 170 |
| Al(NO$_3$)$_2$·9H$_2$O | 0.8 | 0.4 | 105 | 125 | 139 |
| CaSO$_4$·2H$_2$O | 0.4 | 0.2 | 131 | 136 | 190 |

[1] DPI=Diperisophthalic acid.

In all the tests reported in Table I, no explosion was observed, only some smoke. This indicates the compositions are protected against heat-induced detonation. Without additive present, even small amounts (0.1 gram) of the diperisophthalic acid when heated will detonate as evidenced by a loud pop.

Example II illustrates an exemplary free-flowing granular composition coated with about 0.5 weight percent polyvinyl alcohol.

EXAMPLE II

| Additive: | Weight percent |
|---|---|
| Diperisophthalic acid | 23 |
| Isophthalic acid | 0.5 |
| Water | 27.5 |
| Aluminum sulfate | 49 |

The aluminum sulfate and water are present as hydrated aluminum sulfate salt.

The composition of Example II was tested at ambient temperature with a blasting cap and found not to be detonable. In the test, a No. 6 blasting cap is centered within the sample being tested in a test tube and the tube placed in a lead pipe. The blasting cap is exploded and the effect on the lead pipe is observed. A test with undiluted diperisophthalic acid results in considerable deformation of the pipe.

Other tests including one which includes playing the direct flame of a Bunsen burner upon the complete formulation indicate the formulation of Example II is not flammable.

As Example II indicates, the contemplated compositions may contain isophthalic acid and/or monoperisophthalic acid (usually as an incident to the production of the diperacid) as well as diperisophthalic acid. It should also be understood that while it may not always be possible or convenient to distinguish exactly how much of each such isophthalic acid is present, reference to the active oxygen of the composition's isophthalic (including perisophthalic acids) component is a valid indication. Diperisophthalic acid is clearly present when the active oxygen content of isophthalic acids is equivalent to more than 8.8 percent by weight of the composition.

Compositions of diperisophthalic acid and inert, inorganic water-soluble hydrated aluminum salts, especially aluminum sulfate, exemplified by aluminum sulfate octadecahydrate, are especially noteworthy and desirable. Among other things, aluminum sulfate hydrate is uniquely effective in protecting diperisophthalic acid against detonation. Example III illustrates this.

EXAMPLE III

Using the test procedure described in Example I, these results were obtained:

TABLE II

| Peroxy compound | Additive | Compositions as percent by weight of mixture | | | Test results |
| | | Peroxy compound | Active oxygen | Water | |
|---|---|---|---|---|---|
| Diperisophthalic acid | $Na_2SO_4$ | 24 | 3.9 | 25 | No explosion. |
| Do | $Al_2(SO_4)_3$ | 24 | 3.9 | 30 | Do. |
| Diperterephthalic acid | $Na_2SO_4$ | 23 | 3.7 | 25 | Violent explosion. |
| Do | $Al_2(SO_4)_3$ | 22 | 3.6 | 30 | Do. |
| Benzoyl peroxide | $Na_2SO_4$ | 24 | 1.6 | 25 | No explosion. |
| Do | $Al_2(SO_4)_3$ | 24 | 1.6 | 30 | Mild explosion. |

The sodium sulfate containing compositions were prepared by mixing 0.6 gram of the dried peroxy compound with 1.08 grams of $Na_2SO_4 \cdot 10H_2O$ and 0.72 gram of anhydrous sodium sulfate. A mixture of 1.25 grams of $Al_2(SO_4)_3 \cdot 18H_2O$ plus 0.64 gram of partially dried aluminum sulfate (20 percent water) with 0.60 gram of the peroxy compound provided the aluminum sulfate compositions.

The foregoing also illustrates that the hydrated salt content of the compositions is not necessarily present as a specific known hydrate but may be present as a mixture of known hydrates with or without unhydrated salt.

Diperisophthalic acid herein contemplated may be produced according to the method described in the article by Silbert, Siegel and Swern in the Journal of Organic Chemistry, vol. 27, pp .1336–1342 and U.S. Letters Patent 3,143,562, granted Aug. 4, 1964. It has been found according to an embodiment of this invention that dry pulverulent compositions of the diperisophthalic acid and hydrated inert salt herein contemplated are efficiently provided by admixing unhydrated or partially hydrated salt with the acid while it is water wet and thereby producing a free flowing composition. In the method of Silbert et al., hydrogen peroxide and isophthalic acid are reacted in the presence of methanesulfonic acid to produce a slurry of diperisophthalic acid, methanesulfonic acid, hydrogen peroxide and water (generated by the reaction and decomposition of hydrogen peroxide). Upon filtration of the slurry and washing of the filter cake with deionized water, a water wet filter cake is obtained which is primarily diperisophthalic acid containing, by way of illustration, from 0.5 to 2 pounds of water per pound of water insoluble organic component (mainly diperisophthalic acid). Direct drying of this filter cake to obtain dry diperisophthalic acid is not without peril. At temperatures much in excess of 80° C., decomposition of the peracid can be considerable. Furthermore, the dry product can be caused to explode by friction or by exposure to mechanical shock.

In preferred practices, dry, free flowing, powdery compositions of diperisophthalic acid are attained by adding to the water wet filter cake (diperacid and water) a hydratable salt (which contains less than its normal water of hydration at the prevailing condition) in such proportion that the salt takes up the water in the filter cake to form a hydrate. If desired, heat produced by hydration of the salt may be removed during or after the mixing.

Conversion of the wet diperisophthalic acid filter cake to a dry free flowing pulverulent material in this fashion thus circumvents the need for reliance upon elevated temperatures for effecting drying (and the attendant decomposition of diperisophthalic acid) and forms most conveniently a mixture of hydrated salts and the diperisophthalic acid.

These compositions of diperisophthalic acid and hydrated salts (with or without other inert additives including compounds which impart enhanced protection against decomposition) are useful in those services which require the generation of active oxygen. Thus, they are effective bleaching agents for textiles. They are used effectively in commercial or domestic washing machines as bleaching agents, usually being employed in conjunction with the commonly employed detergent. The composition is readily soluble at levels typically useful for such bleaching purposes (particularly with water soluble inert salts). Upon addition to the laundry solution, the composition liberates its oxygen in a form which effectively promotes bleaching.

Among the various conventional detergents with which these compositions can be used are the alkali metal silicates, synthetic organic detergents including sodium dodecyl benzene sulfate or like alkali metal, alkyl or aralkyl sulfate or sulfonate, ethoxylated alkyl phenol adducts, ethoxylated fatty alcohols, and the like. The composition may be premixed with the detergent, particularly when granulated or coated or encapsulated in a protective coating such as hereinbefore described or it may be separately added to the wash solution. When the composition of diperisophthalic acid is to be premixed with the detergent, it is advantageously in a granulated form which has a density approximating that of the detergent with which it is to be mixed. This assists in maintaining the composition uniformly dispersed in the detergent. Usually, the bleaching composition constitutes but a minor portion of the composition which results from its admixture with the organic detergent, typically representing less than 40 percent by weight of the total composition and quite frequently representing less than 5 percent (often as low as 0.5 percent) by weight thereof.

Although the present invention has been described with reference to specific details of certain embodiments, it is not intended that such details shall be regarded as limitations upon the scope of the invention herein described except insofar as details are included in the accompanying claims.

What is claimed is:

1. A solid free flowing composition comprising a mixture of diperisophthalic acid and hydrated magnesium sulfate having a water of hydration content of 0.25 to 5.0 parts per part by weight of diperisophthalic acid, while said diperisophthalic acid is in an undetonated condition, and containing at least 0.5 percent diperisophthalic acid by weight of the diperisophthalic acid and hydrated magnesium sulfate.

2. A solid free flowing composition comprising a mixture of diperisophthalic acid and hydrated magnesium sulfate, the amount of hydrated magnesium sulfate providing the composition with a water of hydration content of at least 0.1 part per part by weight of the diperisophthalic acid, while such diperisophthalic acid is in an undetonated condition, said composition containing at least 0.5 percent diperisophthalic acid by weight of the acid and hydrated magnesium sulfate.

3. A solid free flowing composition comprising diperisophthalic acid and hydrated aluminum sulfate which contains from 0.25 to 5 parts water of hydration per part by weight of diperisophthalic acid, while said diperisophthalic acid is in an undetonated condition, and between 0.05 and 5 percent by weight active oxygen.

4. A solid composition comprising a mixture of diperisophthalic acid and a water soluble inorganic hydrated salt, which salt at atmospheric pressure retains its water of hydration below 30° C. but releases said water of hydration below the normal decomposition temperature of diperisophthalic acid, wherein the hydrated salt is selected from the group consisting of aluminum sulfate, sodium aluminum sulfate, sodium potassium sulfate, sodium sulfate, ammonium aluminum sulfate, potassium aluminum sulfate, magnesium sulfate and calcium sulfate, said mixture containing at least 0.1 part of so releasable water of hydration per part by weight of diperisophthalic acid, while said diperisophthalic acid is in an undetonated condition.

5. A solid free flowing particulate composition comprising a mixture of diperisophthalic acid and sufficient hydrated sodium sulfate to provide at least 0.1 part water of hydration per part by weight of diperisophthalic acid, while said diperisophthalic acid is in an undetonated condition, whereby to dampen the detonability of the acid, said composition containing at least 0.5 percent diperisophthalic acid by weight of the acid and hydrated sodium sulfate.

6. A solid particulate free flowing composition comprising a mixture of diperisophthalic acid and hydrated inorganic salt selected from the group consisting of hydrated salts of sodium, potassium, calcium, aluminum, and magnesium wherein the anion of said salt is selected from the group consisting of sulfate, nitrate, and phosphate which salt at atmospheric pressure retains its water of hydration at temperatures up to 30° C. but releases water of hydration below 130° C., said mixture containing at least 0.1 part of so releasable water of hydration per part by weight of diperisophthalic acid, while said diperisophthalic acid is in an undetonated condition and at least 0.5 percent diperisophthalic acid by weight of the composition.

7. The composition of claim 6 wherein the hydrated salt is selected from the group consisting of aluminum sulfate, sodium aluminum sulfate, sodium potassium sulfate, sodium sulfate, potassium aluminum sulfate, magnesium sulfate and calcium sulfate.

8. A solid composition comprising a mixture of diperisophthalic acid and hydrated inorganic salt selected from the group consisting of hydrated salts of sodium, potassium, calcium, aluminum and magnesium wherein the anion of said salt is selected from the group consisting of sulfate, nitrate and phosphate which salt at atmospheric pressure retains its water of hydration at temperatures up to 30° C. but releases water of hydration below 130° C., said mixture containing at least 0.1 part of so releasable water of hydration per part by weight of diperisophthalic acid while said diperisophthalic acid is in an undetonated condition.

References Cited

UNITED STATES PATENTS

| | | | |
|---|---|---|---|
| 3,494,786 | 2/1970 | Neilsen | 260—502 |
| 3,494,787 | 2/1970 | Lund et al. | 117—100 |

FOREIGN PATENTS

| | | | |
|---|---|---|---|
| 560,389 | 9/1957 | Belgium | 260—502 R |

OTHER REFERENCES

Remy: "Treatise on Inorganic Chemistry," vol. 1, pp. 71–76 (1956).

BERNARD HELFIN, Primary Examiner

W. B. LONE, Assistant Examiner

U.S. Cl. X.R.

252—186